United States Patent [19]

Holmes

[11] Patent Number: 4,627,240
[45] Date of Patent: Dec. 9, 1986

[54] WAVE POWERED MACHINE

[76] Inventor: William A. Holmes, 209 Highland Ave., Piedmont, Calif. 94611

[21] Appl. No.: 238,696

[22] Filed: Feb. 27, 1981

[51] Int. Cl.$^4$ ............................................. F03B 13/12
[52] U.S. Cl. ........................................ 60/507; 60/497; 290/53
[58] Field of Search .......................... 60/496, 497, 507; 290/42, 53; 417/333

[56] References Cited

U.S. PATENT DOCUMENTS

| | | | |
|---|---|---|---|
| 559,969 | 3/1896 | Delmonte | 60/507 |
| 597,832 | 1/1898 | Palmer | 417/333 |
| 1,589,403 | 6/1926 | Krause | 417/333 |
| 2,093,351 | 9/1937 | David | 417/333 |
| 4,108,578 | 8/1978 | Corey | 60/507 |
| 4,184,335 | 1/1980 | Byrne | 60/507 |

FOREIGN PATENT DOCUMENTS

WO81/00284 2/1981 PCT Int'l Appl. ................... 60/507

Primary Examiner—A. Michael Chambers
Attorney, Agent, or Firm—Robert B. Chickering; Glen R. Grunewald

[57] ABSTRACT

A wave powered engine including a float that rises and falls by wave action and which is guided by rails attached to the sea bed to restrict the motion of the float to vertical motion. The float having variable buoyancy and a depending skirt to increase the thrust of the float on upward and downward power strokes, and means on a framework fixed to the ocean bed that cooperates with means fixed to the movement of a shaft as a result of the reciprocating movement of the float.

11 Claims, 3 Drawing Figures

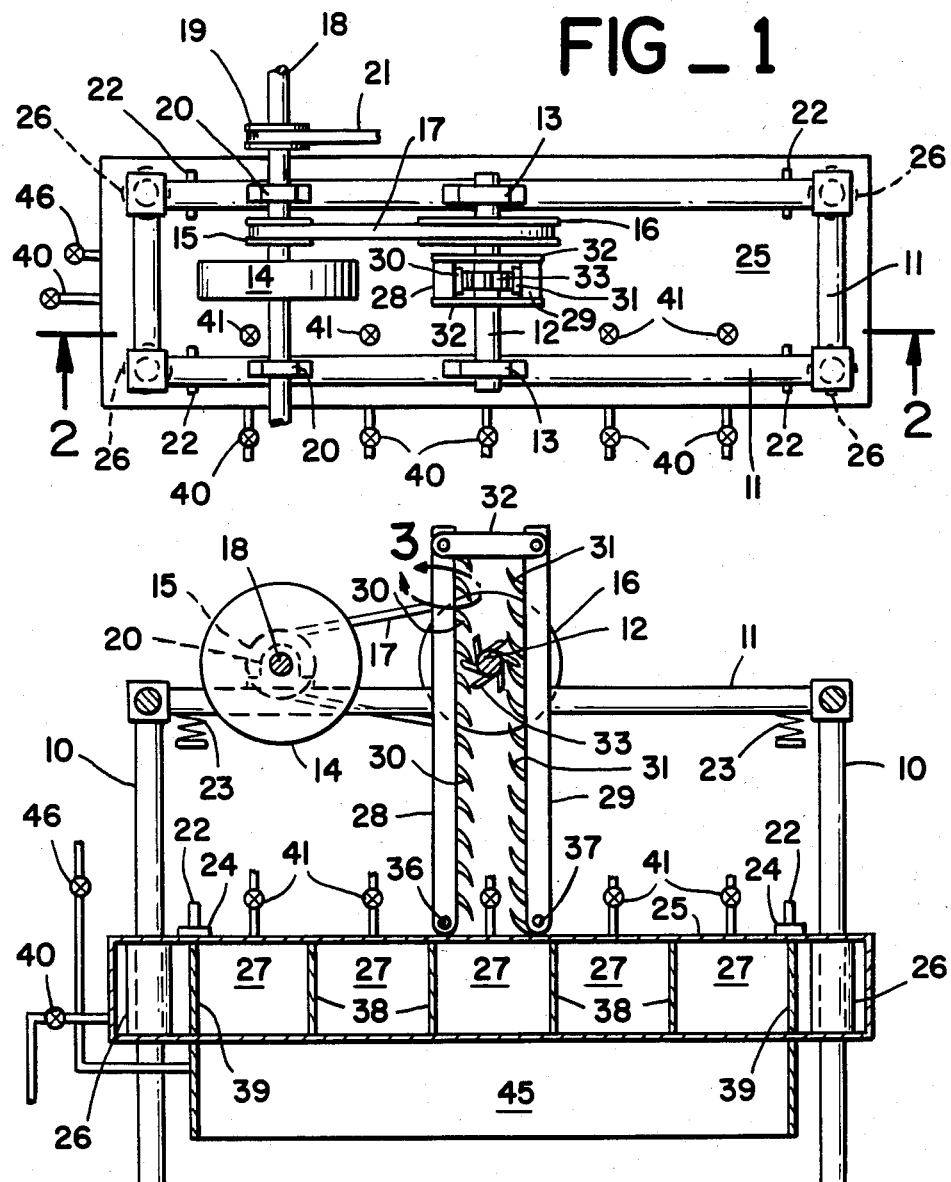
FIG_1
FIG_2
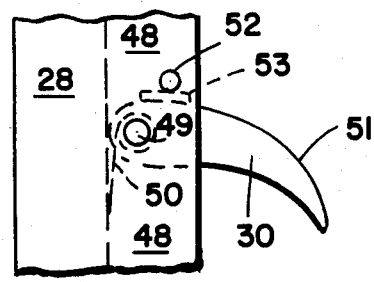
FIG_3

WAVE POWERED MACHINE

BACKGROUND OF THE INVENTION

The depletion of irreplaceable fossil fuels and the widescale pollution resulting from their use has promoted a search for alternative energy sources. Many alternatives to the use of fossil fuels, such as the use of radioactive materials also have serious pollution consequences. One large, non-polluting, replaceable, and inexhaustible source of energy is the wave motion in large bodies of water, particularly ocean waves. Although waves in any body of water may be used in this invention, waves will hereinafter be called ocean waves. Although the amplitude of ocean waves varies from day to day, there is almost no time when waves or swells are not present and accordingly ocean waves are a reliable and constant source of energy.

SUMMARY OF THE INVENTION

This invention is a device for converting the energy in ocean waves to other forms of energy which are more readily used.

The device of this invention includes one or more vertical supports fixed to the bottom of the body of water. The vertical supports are provided with rail means or, the vertical supports themselves, can be the rails, but in any event the vertical supports include means that are vertically oriented and shaped to guide vertical motion of a float as described more fully hereinafter. The vertical supports are also provided with a frame that is maintained at an elevation above the surface of the water.

A shaft is supported on the frame by bearings so that it can rotate and a means to effect rotation of the shaft, such as a pinion, is fixed to the shaft. The frame preferably has a platform which may extend continuously across adjacent frames, in the direction of wave travel, providing ready access and a convenient and safe working area during maintenance or repair. The platform may connect to the shore, forming a pier. The device of this invention includes an elongated float that is engaged with the rail means so that its motion is restricted to vertical motion. The float carries an actuating means that cooperates with the rotating means on the frame to cause the rotating means to rotate unidirectionally during a power stroke of the actuating means when the actuating means rises and falls with the float. The power stroke may be on the upstroke of the actuating means, on the downstroke, or both the upstroke and the downstroke may be power strokes. The float also includes means to vary its buoyancy.

The shaft is also provided with a power take-off which may be as simple as a pulley and belt or it may be that the shaft is directly connected to the armature of a generator or to a pump so that the power generated by the device is taken directly from the shaft. In a preferred embodiment, power is transferred from the shaft incorporating the rotating pinion to a main output shaft by the use of a pulley belt or chain. This provides a distinct advantage. When two or more flotation units are connected in tandem (preferably along the direction of prevailing wave travel), servicing or replacement of the pinion on any one of the units does not necessitate stopping the rotation of the main output shaft, which is continuous along the line of the units. The main output shaft is also provided with one or more flywheels, in a preferred embodiment, to help stabilize its speed of rotation. Again, to facilitate pinion replacement, it is preferable to have the flywheels attached to the main output shaft rather than having them on the shaft which incorporates the pinion.

The device of the invention may include gearing that will provide a rotating shaft at an appropriate speed for the use of the power generated by the device or a transmission to provide variable speeds to accommodate to different power take-offs or to accommodate to varying wave frequency.

In the preferred embodiment of the invention the float is provided with a downwardly opening skirt which in turn is provided with means to vent the interior thereof for purposes more fully described below.

DETAILED DESCRIPTION OF THE INVENTION

The invention may be better understood with reference to the accompanying drawings which illustrate one example of a device embodying the invention.

FIG. 1 is a plan view of a device embodying the invention.

FIG. 2 is a sectional view taken along the line 2—2 of the device of FIG. 1.

FIG. 3 is an enlarged view of portions of the device illustrated in FIG. 2.

The device illustrated in the drawings includes vertical supports 10 which support, among other things, a frame generally designated 11. The frame 11 supports a rotating shaft 12 carried in bearings 13. The shaft 12 has fixed to it a pulley 16 which is connected through a belt 17 and pulley 15 to a main output shaft, generally designated 18, which in turn is supported by bearings 20 on the frame 11. The shaft 18 may have pulley 19 fixed to it which transits power through belt 21 to any of the known devices for consuming power such as, for example, an electric generator or a pump. Shaft 18 is also provided with flywheel 14 to diminish surges in power.

The vertical supports 10 are fixed to the bottom of the body of water and may be such devices as piers that are driven into an ocean bed or that are set in large concrete masses that are sunk in the ocean bed. At any rate, the vertical supports 10 are not affected by wave motion and everything attached to frame 11 or vertical supports 10 is not moved by motion of the water.

A float 25 is connected to vertical support 10 through a rail means. The term rail means includes any interconnection between the vertical supports and the float that guides the motion of the float and restricts it substantially to vertical motion. In the drawings, the float 25 is provided with cylindrical, vertically oriented holes 26 which surround vertical supports 10 so that float 25 is free to move vertically but restricted from moving horizontally. In the drawings the vertical supports themselves are the rail means.

In the illustrated embodiment float 25 has fixed to it racks 28 and 29 having teeth 30 and 31 respectively that engage a pinion 33 that is fixed to the shaft 12. The cooperative engagement of racks 28 and 29 with pinion 33 is such as to produce unidirectional rotation of the shaft 12. As illustrated herein, the teeth 30 on rack 28 and the teeth on pinion 33 are shaped to interlock when the float 25 moves downwardly and are shaped to slide past one another when the float 25 moves upwardly. Likewise, the teeth 31 on rack 29 are shaped to interlock with the teeth on pinion 33 when the float 25 moves upwardly and are shaped to slide past one another when the float 25 moves downwardly. Additionally, the shape of the pinion teeth and the rack teeth are such that the appropriate teeth on racks 28 and 29 will be pulled into closer engagement with the pinion teeth 35 at the proper timing. That is, when the float 25 moves downwardly, the teeth 30 on rack 28, by virtue of their shape will pull themselves into closer engagement with the teeth on pinion 33, while the teeth 31 on rack 29 will, by spring action, tend to push themselves away from and slide by the teeth on pinion 33. Conversely, when the float 25 moves upwardly, the teeth 31 on rack 29, by virtue of their shape, will pull themselves into closer engagement with the teeth on pinion 33, while the teeth 30 on rack 28 will, by spring action, tend to push themselves away from and slide by the teeth on pinion 33. The arrangement illustrated is one of many known devices for producing unidirectional rotation and others may be employed for that purpose. In order for racks 28 and 29 to shift slightly into and out of engagement with the teeth of pinion 33 it is necessary that they have the ability to move toward and away from the center of shaft 12. For this purpose the racks 28 and 29 are connected to float 25 through pivots 36 and 37 while spacer 32 connects the tops of the racks through pivots to allow for the same motion.

The details of the teeth 30 in the rack 28 are illustrated in FIG. 3. Rack 29 with its teeth 31 is essentially the same as rack 28 with its teeth 30 but inverted. As the illustration shows, tooth 30 is held in slot 48 in rack 28 by removable pin 49. Torsion springs 50, also within this slot, exert upward force on each side of the bottom of plate 53, which is joined to the top side of tooth 30 by welding or other suitable means. Thus, plate 53, with tooth 30 behind it is pressed upward against removable pin 52 by spring force. The teeth 30 and 31, and removable pin 52 experience more stress than any other parts of the mechanism and for this reason they should be made of heat-treated carbide steel. Also, convex surfaces 51 on teeth 30 and 31 should have a Teflon coating, preferably. The teeth and pins are easily replaced or rotated by slightly compressing the spring 50, removing the pin 52, releasing the force on the spring and removing pin 49. After removal, the teeth 30 can be replaced or rotated to extend tooth life. Teeth engaged when the float is at or near mean sea level will experience the most wear and they can be rotated with teeth above and below them that experience less wear. Pinion 33 on shaft 12, which also experiences considerable wear, is likewise easily accessible, further minimizing time required for servicing the device. The device may also be equipped with other means for converting reciprocal motion to rotary motion which are known to the art.

It is a preferred feature of this invention that the float 25 has varying buoyancy. In order to provide a float with varying buoyancy, pipe and valve assemblies 40 provide passageways through which water may be introduced into each of the compartments 27 within the interior of float 25. The water acts as ballast. Pipe and valve assemblies 41 open above the surface of the water and provide means for regulating the buoyancy by venting the interiors of compartments 27 when water is to be introduced and by providing an entry for compressed air when water is to be released from the interiors of any compartments 27. Valves are not actually required in assemblies 40 since controlling the inlet of air to or the outlet of air from the interior of compartments 27 is all that is required to regulate the buoyancy of the float. The valves are for added safety.

In a particularly preferred embodiment of the invention an open-bottomed skirt 45 is provided on the bottom of float 25. The skirt is connected to the bottom of float 25 through a connection that seals the bottom of the float to the top of the skirt from leakage of water or air. Skirt 45 will normally be completely vented of air through pipe and valve assembly 46 so that it is filled with water when the device is in use. However, introduction of air through pipe and valve assembly 46 can drive water out of skirt 45 to increase the buoyancy of the float assembly. Normally skirt 45 would only be filled with air during periods of repair or maintenance when it is desired to increase the buoyancy of the whole float assembly to have float 25 as far out of the water as possible. At those times, chain hoists are hung from the frame 11 and connected to lifting lugs 22 attached to the top surface of the float, to enable repairmen to raise the entire float mechanism (now devoid of ballast) as high as possible. During normal operation of the device skirt 45 is filled with water and it then has the desirable effects of increasing the effective weight of float 25 during the downward movement of the float and, by virtue of its shape, catching additional upward momentum during the upward surge of the wave. To maximize these effects, skirt 45 should extend laterally to the outside edge of the float, but not include the piling guides.

The device illustrated in FIGS. 1 and 2 is shown in an elementary form. It is evident that many modifications and refinements of the device may be employed to increase its utility for specific purposes. For example, the device may be provided with a transmission connected to shaft 18 to provide a faster rotating shaft. A single main output shaft may be connected to different floats that are located different distances from shore whereby the different floats may provide power to the same shaft at different times thereby diminishing the pulsing effect characteristic of power extracted from ocean waves.

The device of the invention as described above will normally be used by setting vertical supports 10 in the bottom of a body of water, preferably off-shore a distance where waves will be large but not breaking when they pass beneath the device. The device is oriented with respect to the shoreline so that the long dimension of float 25 is either roughly parallel to the shoreline or parallel to the prevailing direction of crests of waves as they approach the shoreline. When the structure is assembled the interior of skirt 45 will first be vented so that skirt 45 fills with water and then the interior of float 25 may be vented and float 25 filled with water to an extent where the power available to turn shaft 12 that is derived from the upward surges of the waves against the bottom of float 25, roughly equals the power available to turn shaft 12 that is derived from the falling of the float with its contained ballast. Thus, the proper amount of ballast within float 25 will act to stabilize the power output of the device and further reduce the beforementioned pulsing effect characteristic of the actuating source. The optimum amount of ballast may vary with the degree of wave activity and can be adjusted accordingly. The valve assemblies 40 and 41 at each compartment 27 allow for this adjustment. The vented compartments 27 within the float 25, spaced symmetrically with respect to the vertical axis of the float enable the amount of ballast of the float to be adjusted and properly distributed, while avoiding energy losses which result from a sloshing effect with partially full ballast compartments. Spacing of the compartments 27 symmetrically with respect to the vertical axis of the float will reduce the tendency of the float to bind on the rails or piling guides. Since wave motion largely involves the up-and-down motion of water without significant horizontal flow, this float mechanism, through its up-and-down orientation, will be able to extract the energy of wave motion effectively.

The springs 23 located on the frame 11 and the pads 24 on the top of the float 25 prevent damage to the structure from an occasional swell having sufficient energy to push the top of the float into contact with the frame, by absorbing some of that energy and returning it to the float in a downward push. Reinforcing plates or struts 39 within the float directly underneath both the pads 24 and the lifting lugs 22, serving as structural reinforcing, are a preferred embodiment, as are reinforcing plates or struts 38 directly beneath the rack pivots 36 and 37. The side of the frame 11 which is away from the side holding the main output shaft is a good place to attach sheathing as support for vehicular access, and this bracing also serves to stabilize the structure.

The invention also permits filling both skirt 45 and compartments 27 with water whereby the float will submerge and rest on the bottom of the body of water. This condition will be appropriate in extremely rough weather where the violent motion of waves is too great to maintain control over the functioning of the device. Under such conditions the presence of float 25 resting on the bottom of the body of water will stabilize the framework.

When using the rotary motion of the secondary shaft to drive a pump directly rather than to generate electricity, there is not as much need to balance the power derived from upstroke and downstroke motions of the actuating source. For a pumping application it is more important to obtain a maximum of rotational energy from the system than to produce the smooth output desired for driving electrical generating equipment. Thus, when the device is used to pump water, or oil, or other fluids, the need for a flywheel is less critical.

A very effective method of providing both a smooth power output and a reserve power buffer is to maintain an elevated saltwater reservoir within pumping range of the device. Using this method, the shaft output of the device is used to pump seawater to an elevated location, and power is extracted by conventional hydroelectric means when the seawater is allowed to return to the ocean via a different set of pipes. The elevated reservoir is also a reserve energy source for use in the event that the wave-powered engine is damaged or needs maintenance, or simply to help meet peak requirements or to offset exceptionally calm days.

What is claimed is:

1. A device to convert the motion of waves in a body of water to other forms of energy comprising:
    a. vertical supports fixed to the bottom of said body of water,
    b. rail means supported by said vertical supports,
    c. a frame fixed to said vertical supports at an elevation above the surface of said body of water,
    d. a shaft supported on said frame to rotate,
    e. rotating means fixed to said shaft,
    f. a float engaged with said rail means to move vertically up and down from the influence of waves, said float carrying actuating means in the form of two vertical racks pivotally connected to said float and with their upper extremities pivotally connected to a common link, one of said racks adapted to drive said rotating means on an upstroke of said float and the other of said racks to drive said rotating means on a downstroke of said float, said actuating means cooperating with said rotating means to cause said rotating means to rotate unidirectionally during a power stroke of said actuating means,
    g. a power take-off from said shaft, and
    h. said float having a skirt fixed to the bottom thereof, said skirt having means to vent the space beneath it.
2. The device of claim 1 having a flywheel.
3. The device of claim 1 wherein said vertical supports are said rails.
4. The device of claim 1 having a second shaft, said second shaft being mechanically connected to said shaft and having a power take-off.
5. The device of claim 4 having a flywheel on said second shaft.
6. The device of claim 1 including means to vary the buoyancy of said float.
7. The device of claim 6 wherein said means to vary the buoyancy of said float comprises a valved opening between the interior of said float and the air and an opening between the interior of said float and the water in which said float is floating.
8. The device of claim 6 wherein said float comprises a plurality of sealed chambers.
9. The device of claim 8 wherein said chambers are symmetrically positioned within said float and adapted to be indepedently filled with and emptied of water.
10. The device of claim 1 wherein said rotation means is actuated by two actuating means, the first of said actuating means providing power on the upward movement of said float and the second of said actuating means providing power on the down stroke of said float.
11. The device of claim 1 wherein said float is elongated with its long axis substantially parallel to prevailing line of crests of waves approaching the shore.

* * * * *